US007837405B2

(12) United States Patent
Amdahl

(10) Patent No.: US 7,837,405 B2
(45) Date of Patent: Nov. 23, 2010

(54) DISPOSABLE CLIP FOR COUPLING BINDING ELEMENTS AND COMBINATION OF BINDING ELEMENTS WITH DISPOSABLE COUPLING CLIP

(75) Inventor: Samuel P. Amdahl, Prospect Heights, IL (US)

(73) Assignee: General Binding Corporation, Lincolnshire, IL (US)

( * ) Notice: Subject to any disclaimer, the term of this patent is extended or adjusted under 35 U.S.C. 154(b) by 0 days.

(21) Appl. No.: 12/560,841

(22) Filed: Sep. 16, 2009

(65) Prior Publication Data

US 2010/0003069 A1 Jan. 7, 2010

Related U.S. Application Data

(63) Continuation of application No. 11/108,006, filed on Apr. 15, 2005, now abandoned.

(60) Provisional application No. 60/563,100, filed on Apr. 16, 2004.

(51) Int. Cl.

| | |
|---|---|
| ***B42F 3/00*** | (2006.01) |
| ***B42F 13/02*** | (2006.01) |
| ***B42F 1/00*** | (2006.01) |
| ***A41F 1/00*** | (2006.01) |
| ***A44B 1/04*** | (2006.01) |
| ***A44B 11/25*** | (2006.01) |
| ***A44B 17/00*** | (2006.01) |
| ***B25G 3/18*** | (2006.01) |
| ***F16B 21/00*** | (2006.01) |
| ***F16D 1/00*** | (2006.01) |

(52) U.S. Cl. ............................ 402/8; 24/487; 403/326; 403/329

(58) Field of Classification Search .............. 206/459.2, 206/232, 534, 831, 214, 449; 24/456, 545, 24/555, 557, 563, 336, 300, 329, 459, 485, 24/487, 530, 531, 910, 573.3; 403/326, 329, 403/385, 391, 397; 248/229.16, 229.26; D8/395, 396; 402/8; 281/45
See application file for complete search history.

(56) References Cited

U.S. PATENT DOCUMENTS 172,262 A 1/1876 Cummings (Continued)

FOREIGN PATENT DOCUMENTS

WO 01/68379 9/2001

*Primary Examiner*—Dana Ross
*Assistant Examiner*—Kyle Grabowski
(74) *Attorney, Agent, or Firm*—Michael Best & Friedrich LLP

(57) ABSTRACT

The invention includes a combination of coupling clip structure and a plurality of binding elements for binding stacks of perforated sheets for delivery to an automated machine. The combination comprises at least two binding elements, and at least one coupling clip discrete from said at least two binding elements. At least one of the coupling clip or the binding element(s) comprises at least one recess, at least a portion of at least one said binding element being disposed in said recess in the coupling clip and/or at least a portion of the coupling clip being disposed in said recess in the binding element, the coupling clip coupling the at least two binding elements together in a predetermined adjacent spatial relationship. The coupling clip may be separated from the binding elements by the automated machine. The invention further includes a method of coupling a plurality of binding elements together with at least one coupling clip for delivery to an automated machine.

18 Claims, 8 Drawing Sheets

U.S. PATENT DOCUMENTS

| | | | | |
|---|---|---|---|---|
| 1,800,109 | A | 4/1931 | Selig | |
| 2,089,881 | A | 8/1937 | Dohring | |
| 2,112,389 | A | 3/1938 | Trussell | |
| 2,363,848 | A | 11/1944 | Emmer | |
| 2,435,848 | A | 2/1948 | Schade | |
| 2,466,451 | A | 4/1949 | Liebman | |
| 2,555,947 | A | 6/1951 | Trussell | |
| 3,460,860 | A | 8/1969 | Stevens, Jr. | |
| 3,543,376 | A | 12/1970 | Lovell et al. | |
| 3,683,462 | A * | 8/1972 | Voigt | 24/564 |
| 3,793,758 | A * | 2/1974 | Feldhusen et al. | 40/530 |
| RE28,202 | E | 10/1974 | Abildgaard et al. | |
| 3,839,759 | A | 10/1974 | Staats et al. | |
| 4,031,585 | A | 6/1977 | Adams | |
| 4,296,524 | A | 10/1981 | Horholt et al. | |
| 4,369,013 | A | 1/1983 | Abildgaard et al. | |
| 4,398,856 | A | 8/1983 | Archer et al. | |
| 4,487,538 | A | 12/1984 | Jones et al. | |
| 4,525,117 | A | 6/1985 | Jones | |
| 4,566,157 | A | 1/1986 | Packendorff | |
| 4,607,970 | A | 8/1986 | Heusinkveld | |
| 4,645,399 | A | 2/1987 | Scharer | |
| 4,832,370 | A | 5/1989 | Jones | |
| 4,873,858 | A | 10/1989 | Jones | |
| 4,900,211 | A | 2/1990 | Vercillo | |
| 4,904,103 | A | 2/1990 | Im | |
| 4,934,890 | A | 6/1990 | Flatt | |
| 5,028,159 | A | 7/1991 | Amrich et al. | |
| 5,056,198 | A | 10/1991 | Viglione | |
| 5,090,859 | A | 2/1992 | Nanos et al. | |
| 5,370,489 | A | 12/1994 | Bagrosky | |
| 5,383,257 | A | 1/1995 | Krauss | |
| 5,464,312 | A | 11/1995 | Hotkowski et al. | |
| 5,465,472 | A | 11/1995 | Matoba | |
| 5,636,869 | A * | 6/1997 | Holmes | 281/45 |
| 5,725,251 | A | 3/1998 | Heggeland | |
| 5,966,782 | A | 10/1999 | Ishihara et al. | |
| 6,101,686 | A | 8/2000 | Velthoven et al. | |
| 6,408,494 | B1 | 6/2002 | Anscher | |
| 6,446,314 | B1 | 9/2002 | Anscher | |
| 2003/0031502 | A1 * | 2/2003 | Rothschild | 402/60 |

* cited by examiner

DISPOSABLE CLIP FOR COUPLING BINDING ELEMENTS AND COMBINATION OF BINDING ELEMENTS WITH DISPOSABLE COUPLING CLIP

RELATED APPLICATIONS

This application is a continuation of U.S. patent application Ser. No. 11/108,006, filed Apr. 15, 2005, and which claimed the benefit of U.S. Provisional Patent Application No. 60/563,100, filed Apr. 16, 2004, the entire contents of which are hereby incorporated herein by reference.

FIELD OF THE INVENTION

The present invention relates to binding elements for holding a plurality of perforated sheets or the like, and more specifically the invention pertains to structure for coupling binding elements for use in automated binding processes.

BACKGROUND OF THE INVENTION

Various types of binding elements have been utilized to bind a stack of perforated sheets or the like. Binding elements typically include a spine from which a plurality of fingers extends which may be assembled through perforations in a stack of sheets. This spine may be linear, with or without a longitudinally extending hinge. Alternately, the spine may be formed by sequential bending of a wire, as with wire comb or hanger type binding elements.

Examples of such binding elements which are of a wire comb or hanger-type design are disclosed, for example, in U.S. Pat. No. 2,112,389 to Trussell and U.S. Pat. Nos. 4,832,370 and 4,873,858 to Jones, while machines for assembling such binders are disclosed in U.S. Pat. No. 4,031,585 to Adams, U.S. Pat. No. 4,398,856 to Archer et al., U.S. Pat. No. 4,525,117 to Jones, U.S. Pat. No. 4,934,890 to Flatt, and U.S. Pat. No. 5,370,489 to Bagroky. Other binding devices are disclosed, for example, in the following references: U.S. Pat. Nos. 2,089,881 and 2,363,848 to Emmer, U.S. Pat. No. 2,435,848 to Schade, U.S. Pat. No. 2,466,451 to Liebman, U.S. Pat. No. 4,607,970 to Heusenkveld, U.S. Pat. No. 4,904,103 to Im, U.S. Pat. No. 5,028,159 to Amrich et al., U.S. Pat. No. 4,369,013, Reexamination Certificate B1 4,369,013 and Re. 28,202 to Abildgaard et al. Machines for assembling plastic comb or finger binding elements are disclosed in patents such as U.S. Pat. No. 4,645,399 to Scharer, U.S. Pat. No. 4,900,211 to Vercillo, U.S. Pat. No. 5,090,859 to Nanos et al., and U.S. Pat. No. 5,464,312 to Hotkowski et al. The patents are included herein by reference.

Due to the structure of such binding devices, which include elongated spines and fingers, the binding devices commonly become entangled when stored in a group. Thus, mechanical binding processes are considered to be either cumbersome and labor intensive, or complicated and expensive, requiring dedicated machines. Detangling the binding elements in order to assemble the element to a stack of sheets or lay the element into a binding machine can be a tedious and potentially time consuming process. Further, this tendency to become entangled may complicate or prevent the use of such binding devices in automated binding processes or machines wherein an automated feed is desirable. The time required to manually feed binding elements into a machine would be prohibitive to efficient, high-volume automated binding operations.

Relatively low cost, manual, semi-automatic machines are commonly utilized in binding successive single documents by loading single elements by hand into such machines. In such manual arrangements, various issues present obstacles to efficient utilization. In such arrangements, one or more binding elements must be untangled from a box, exposing the operator to possible sharp corners and points, and then oriented and loaded by hand into a machine and/or another portion of the binding element.

Relatively high cost, automated machines likewise present challenges that have yet to be successfully overcome. For example, elements may be presented to automated machines in cassettes, which are typically formed of plastic, or attached to a backing with an adhesive or mechanical coupler. Such presentation methods result in excessive volumes of waste that must be stored and ultimately discarded. Additionally, the use of adhesive in such coupling can make the coupling vulnerable to atmospheric factors, causing the adhesive to loosen or lose its holding properties. Various other methods have been proposed for coupling binding elements together for packing, shipping, or feeding to an automated process. Such arrangements are disclosed, for example, in P.C.T. Application PCT/US0106362, filed Feb. 28, 2001, based upon U.S. Provisional Application 60/188,372, which likewise are assigned to the assignee of the present application and is hereby incorporated by reference in its entirety. At least a portion of these arrangements have not been commonly utilized, however. While some types of binding elements may be preformed and delivered to the automated binding machine on spools, spools are generally quite large, bulky, weighty and cumbersome, and still require the use of separating paper to prevent tangling. Additionally, they typically require skilled operator set up. Accordingly, there still exists a need for alternate or additional arrangements that may be successfully and economically automated at a relatively low cost and with minimal associated waste.

BRIEF SUMMARY OF THE INVENTION

The invention provides a clip-type coupling structure for coupling a plurality of binding elements to provide a combination of binding elements and coupling clips that is particularly suitable for packaging and shipment, as well as usage in automated binding processes, and various methods of utilizing the same. In accordance with the invention, a separately formed coupling clip is provided that releasably engages at least two binding elements to temporarily couple the binding elements to maintain their respective relative positions. A plurality of binding elements in this form may be provided either as discrete sheets, or as a continuous sheet which is rolled up, for example, for storage, shipping, or feeding to an automated binding process. In use, the coupling clip is separated from the binding elements to allow separate usage of the binding elements.

The coupling clip may be of any appropriate design. The coupling clip preferably includes a plurality of legs that partially surround a portion of at least two adjacently disposed binding elements. In the currently preferred embodiment, two pairs of legs are provided, the pairs of legs being coupled by a base element. Each pair of legs is adapted to surround any appropriate portions of the binding elements, e.g., spine to spine, spine to finger, or finger to finger. It is envisioned that alternate designs may be utilized. For example, a design with three such legs may be utilized wherein one leg is common holds the pair of binding elements, or a base with two legs may be utilized. The base and legs may be of any appropriate design or length so long as the clip temporarily couples the binding elements.

Preferably, the design is such that the application of an external force to coupling clip causes release of one or more of the coupled binding elements. This may be accomplished by including one or more portions that flex to allow the separation of the legs, or example. In one embodiment, two pairs of legs are provided to couple two adjacent binding elements, an inwardly disposed leg and an outwardly disposed leg. The inwardly disposed legs may be formed on a portion of the base section wherein application of a force to that base section cause the legs to flex slightly apart from one another, releasing the coupled binding elements. In an alternate embodiment, the base includes flanges that extend from the sides of the coupling clip such that application of a force to a flange causes the adjacent outwardly disposed leg to flex outward from the adjacent portion of the coupling clip holding the binding element. The coupling clip may thus elastically flex to allow the coupling or decoupling of the binding elements. Alternately, the coupling clip may be designed to move between at least two discrete positions, clamping and unclamping positions.

In utilizing such coupling clips, one or more may be utilized to couple binding elements in a given spatial relationship. For example, one, two, three or more such coupling clips may be utilized to couple a pair of binding elements. Additionally, this same or a different number of such coupling clips may be utilized to couple one of the pair of binding elements to a third binding element, and onward to a plurality of binding elements to create a continuous length of binding elements.

Alternately, a single coupling clip may couple more than two binding elements in a given spatial relationship. As with a coupling clip that couples only two binding elements in a given spatial relationship, a plurality of such coupling clips that couple more than two binding elements in a given spatial relationship may be utilized along the length of the plurality of binding elements to be coupled. In one such embodiment, the coupling clip is in the form of a carrier strip that couples three or more binding elements in a given special relationship, the carrier strip including a plurality of such individual coupling arrangements for coupling to the binding elements.

Thus, the coupling clip arrangement provides an economical means by which a plurality of binding strips may be coupled in a given spatial relationship for storage, shipping or feeding to an automated process. Such an automated process may include a means by which a force is applied to the coupling clip or the binding element to separate the binding element from the clip. The coupling clip may ten be dropped into a collection container for disposal or reuse. The coupling clip does not damage or interfere with the use or final appearance of the coupled binding elements.

The coupling clip may be economically manufactured using conventional molding techniques.

These and other objects and advantages of the invention will be apparent to those skilled in the art upon reading the following detailed description and upon reference to the drawings.

DETAILED DESCRIPTION OF THE INVENTION

Figure 1:
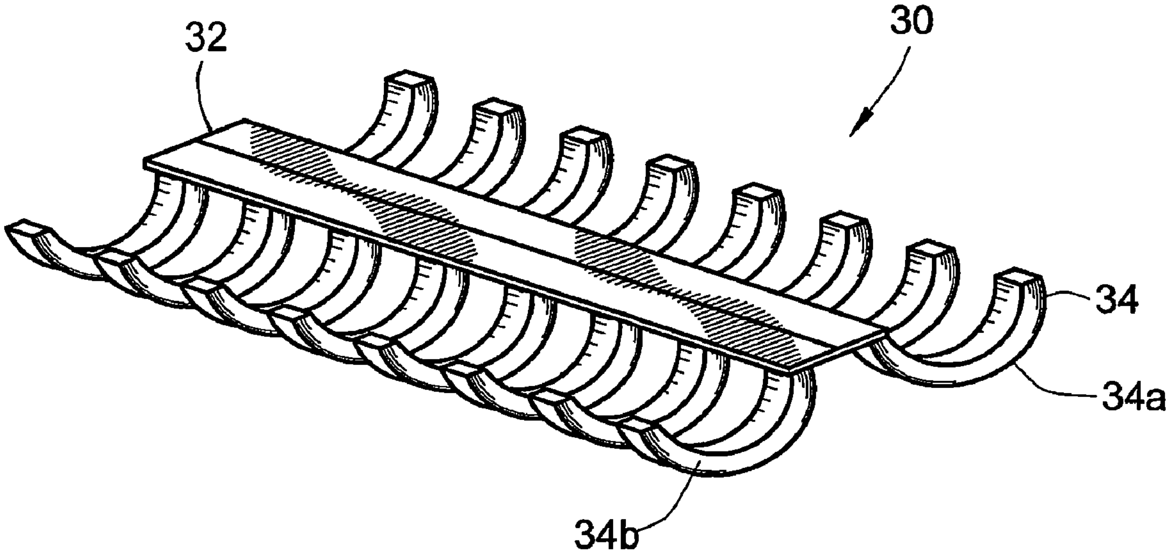
FIG. 1 (PRIOR ART)
FIG. 1 is a perspective view of a binding element of the prior art.

Turning now to the drawings, there is shown in FIG. 1 a binding element 30 constructed according to the teachings of the prior art. The binding element 30 includes a spine 32 from which a plurality of fingers 34 extends. The fingers 34 of the illustrated binding element 30 include two portions 34*a*, 34*b* that meet to form a closed finger loop, as will be appreciated by those of skill in the art. It will further be appreciated that the illustrated binding element 30 is merely representative of binding elements of the prior art, and is not intended to limit the scope of the present invention. The present invention is equally applicable to binding elements of alternate design, such as, for example, those various types of binding elements mentioned in the Background of the Invention section of this disclosure. Moreover, the binding element may be of substantially any design, and may be of substantially any length.

Figure 2:
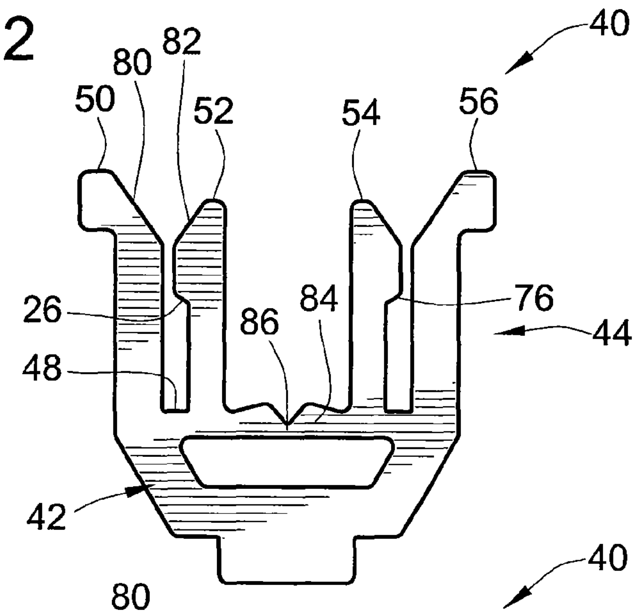
FIG. 2 is a front elevational view of a coupling clip constructed in accordance with teachings of the invention for coupling a plurality of binding elements.
Figure 3:
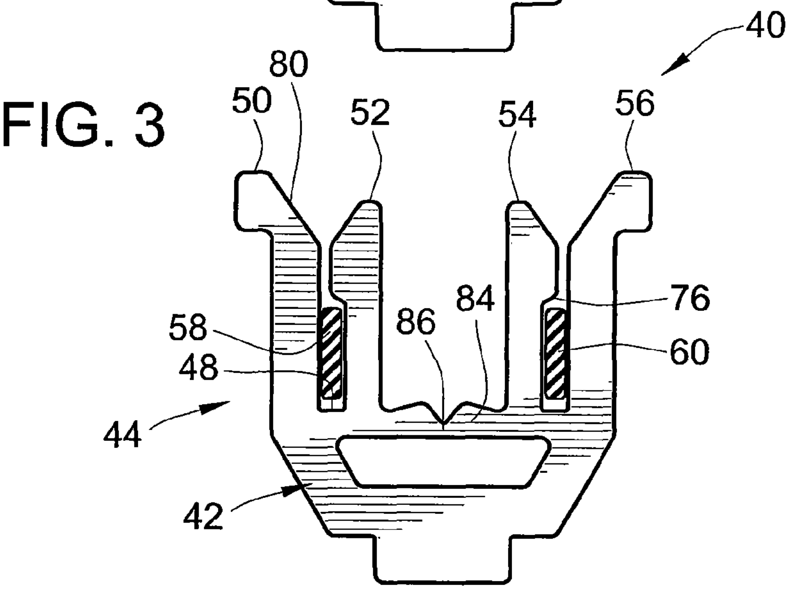
FIG. 3 is a front elevational view of the coupling clip of FIG. 2 engaged with a plurality of binding elements, the binding elements being shown in cross-section.

In accordance with aspects of the invention, there is provided a coupling clip for coupling a plurality of binding elements in a given spatial relationship, and a combination of one or more coupling clips with a plurality of binding elements. An embodiment of such a coupling clip 40 is shown in FIG. 2. The clip 40 includes a base portion 42 and a coupling portion 44 for receiving a portion of each of at least a pair of binding elements to couple them together. The coupling portion 44 includes preferably includes at least one leg that forms a recess 48 for receiving a portion of one or more binding elements. In the illustrated embodiment, two pairs of such legs 50, 52, 54, 56 are provided. As shown in FIG. 3, the spines of respective binding elements 58, 60 are received in the recesses 48 between the legs 50, 52 and 54, 56 of the pairs to maintain the binding elements in a given spatial relationship. It will be appreciated by those of skill in the art that alternate portions of the binding elements 58, 60 may be disposed the recesses 48. For example, the fingers may be disposed in the recesses, or the finger of one binding element and the spine of another binding element may be disposed in the respective recesses.

Figure 4:
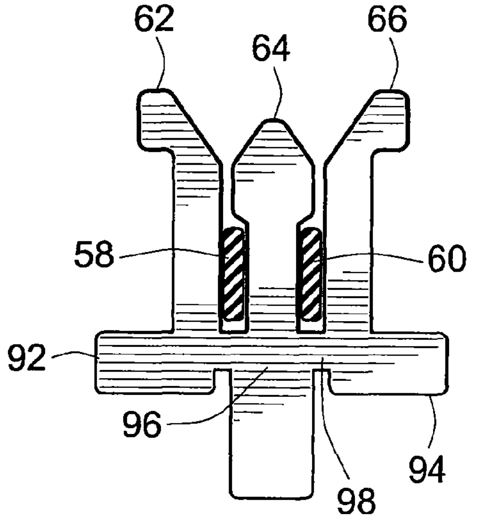
FIG. 4 is a front elevational view of an alternate embodiment of the coupling clip constructed in accordance with teachings of the invention.
Figure 5:
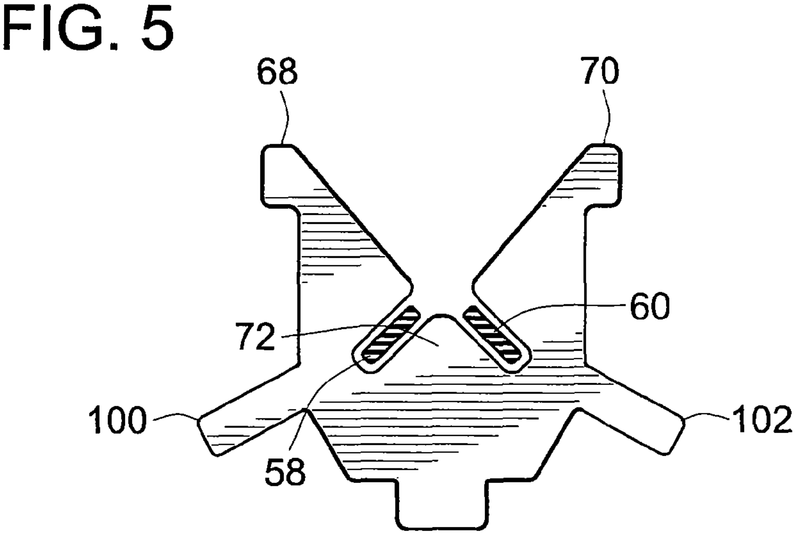
FIG. 5 is a front elevational view another alternate embodiment of the coupling clip constructed in accordance with teachings of the invention.
Figure 6:
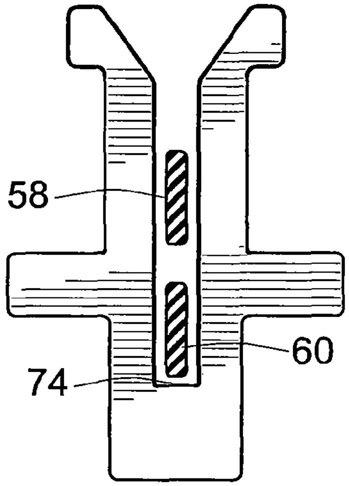
FIG. 6 is a front elevational view another alternate embodiment of the coupling clip constructed in accordance with teachings of the invention.
Figure 10:
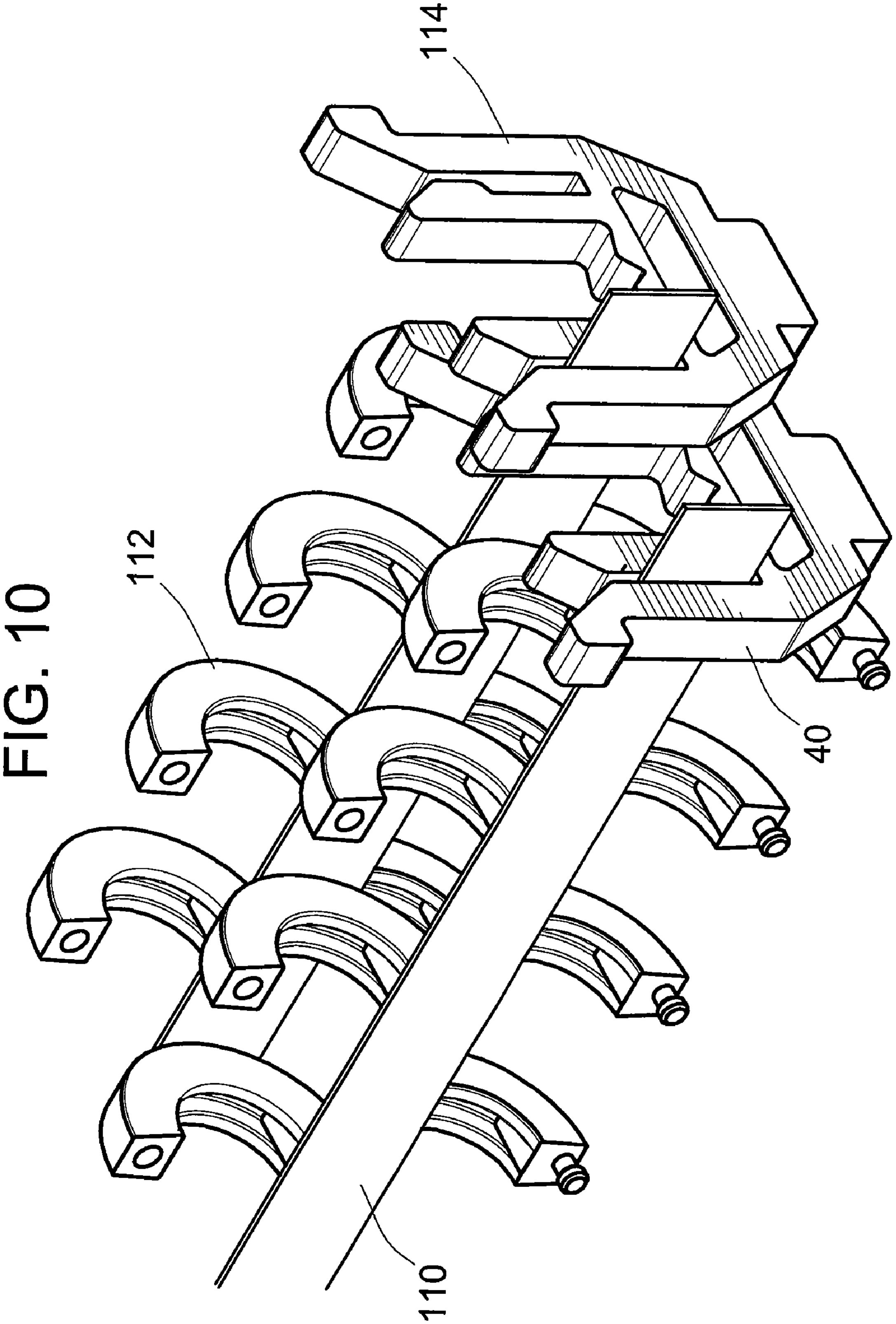
FIG. 10 is a perspective view of a plurality of binding elements of the prior art coupled together by a plurality of coupling clips constructed in accordance with teachings of the invention.

It will further be appreciated by those of skill in the art that the coupling portion 44 may be alternately designed. For example, three, rather than four such legs 62, 64, 66 may be provided, as shown in FIG. 4. In this embodiment, a single central leg 64 supports both binding elements 58, 60, the remaining two legs 62, 66 each supporting a respective binding element 58, 60. In another alternate embodiment, only two such legs 68, 70 are provided, the binding elements 58, 60 being disposed between a respective one of said legs 68, 70 and the base portion 72, as shown in FIG. 5. Alternately, portions of both binding elements 58, 60 may be disposed in a single recess 74 as shown in FIG. 6. It will be appreciated that numerous alternate designs may be provided within the scope of the invention utilizing an alternate number of legs and structures. It will be appreciated by those of skill in the art, however, that it is preferable that the binding elements be parallelly disposed, as shown for example in FIG. 3, in order to facilitate compact and efficient packing, as shown in FIG. 10.

Returning now to FIGS. 2 and 3, in order to maintain the spines 58, 60 in the recess(es) 48, the binding elements 58, 60 may be press-fit or snap-locked in position. Such a snap-locked design is shown, for example, in FIG. 2, wherein a protrusion 76 is provided that inhibits the movement of the binding elements 58, 60 from the respective recesses 48. In this embodiment, the protrusion 76 is disposed along inner legs 52, 54, although such a protrusion may be alternately disposed or additional protrusions provided.

Also as shown in FIG. 2, the fingers 50, 52, 54, 56 may include structure that facilitates assembly of the binding elements 58, 60 into the coupling clip 30. For example, the fingers 50, 52, 54, 56 may be provided with ramped surfaces 80, 82 that guide the binding element 58, 60 into the adjacent recess 48.

Figure 9:
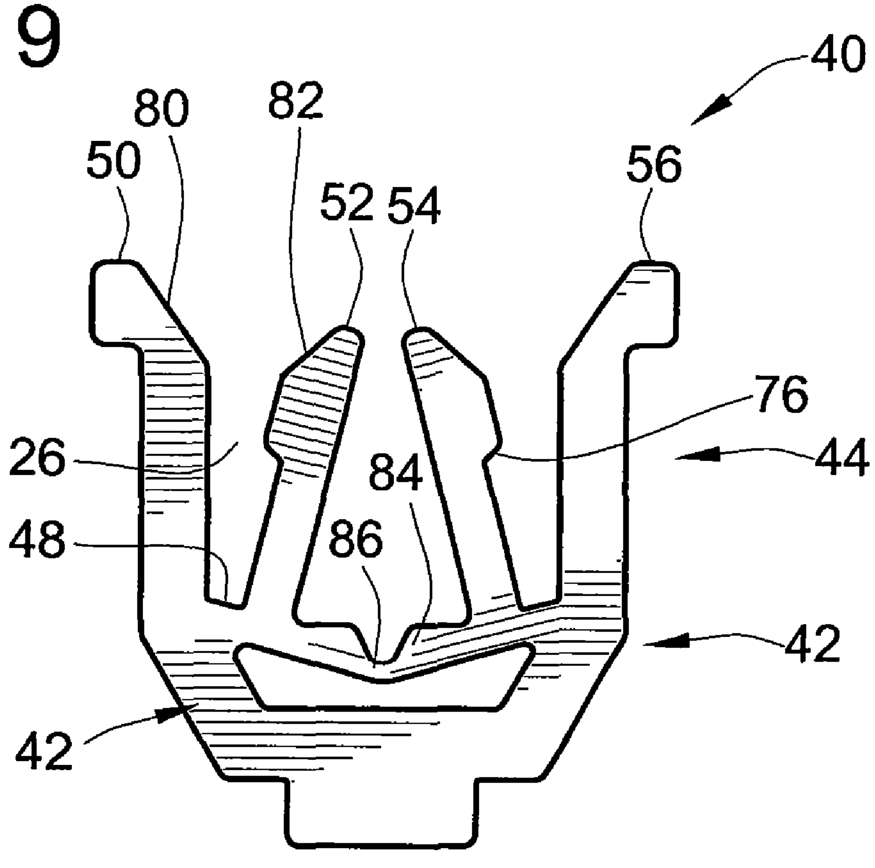
FIG. 9 is a front elevational view of the coupling clip and binding elements of FIGS. 2 and 3 wherein a force is applied to separate the coupling clip and binding elements.

According to an important aspect of the invention, the binding elements 58, 60 may be readily released from the clip 40, preferably by the application of an outside force to the coupling clip 40. In this way, the coupling clip 40 may be separated from the binding elements 58, 60 without damaging the binding elements 58, 60 so that they may be readily utilized in a manual or automated binding process. In the embodiment of FIGS. 2 and 3, the base portion 42 comprises a force-receiving section 84, the inner legs 52, 54 extending from the force-receiving section 84. It will be appreciated by those of skill in the art that relative geometry of the force-receiving section 84 and the remaining portion of the base section 42 and fingers 50, 56 are such that a force applied to the force-receiving section 84, as shown in FIG. 9, will result in a bending or arching of the coupling clip 40 such that the inner fingers 52, 54 move toward each other, that is, away from the outer fingers 50, 56 such that the binding elements 58, 60 disposed in the recesses 48 are free to pass out of the recesses 48. More preferably, the force-receiving section 84 comprises an area of weakness 86 that concentrates the stress of a force applied thereto such that a localized bending occurs at that portion of the force-receiving section 84, as may likewise be seen in FIG. 9.

Figure 7:
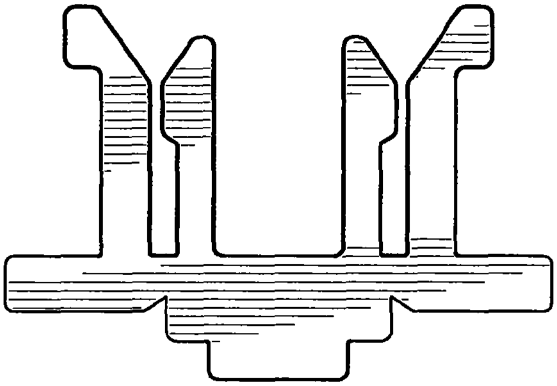
FIG. 7 is a front elevational view of another embodiment of the coupling clip constructed in accordance with teachings of the inventions.
Figure 8:
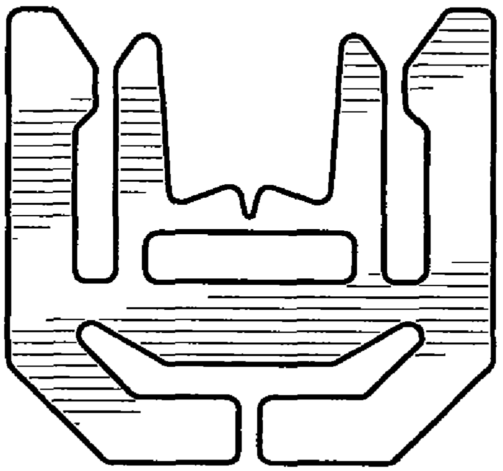
FIG. 8 is a front elevational view of another embodiment of the coupling clip constructed in accordance with teachings of the inventions.

Alternate arrangements may be provided whereby the coupling clip releases the coupled binding elements upon application of an external force. Returning to FIG. 4, for example, the force-receiving portion may be in the form of a pair of force-receiving arms 92, 94 extending from the base 96 substantially adjacent the outer legs 62, 66. In this embodiment, areas of reduced thickness 98 cause the outer legs 62, 66 to flex outward when a force is exerted on the arms 92, 94, releasing the binding elements 58, 60. A similar arrangement is shown, for example, in FIG. 7. Alternately, such force-receiving arms 100, 102 may extend outward directly from the outer legs 68, 70, as shown in FIG. 5. In this way, the legs 68, 70 would bend or flex outward, again, releasing the binding elements 58, 60. It will be appreciated by those of skill in the art that alternate arrangements or combinations of these arrangements may likewise be utilized.

Figure 11:
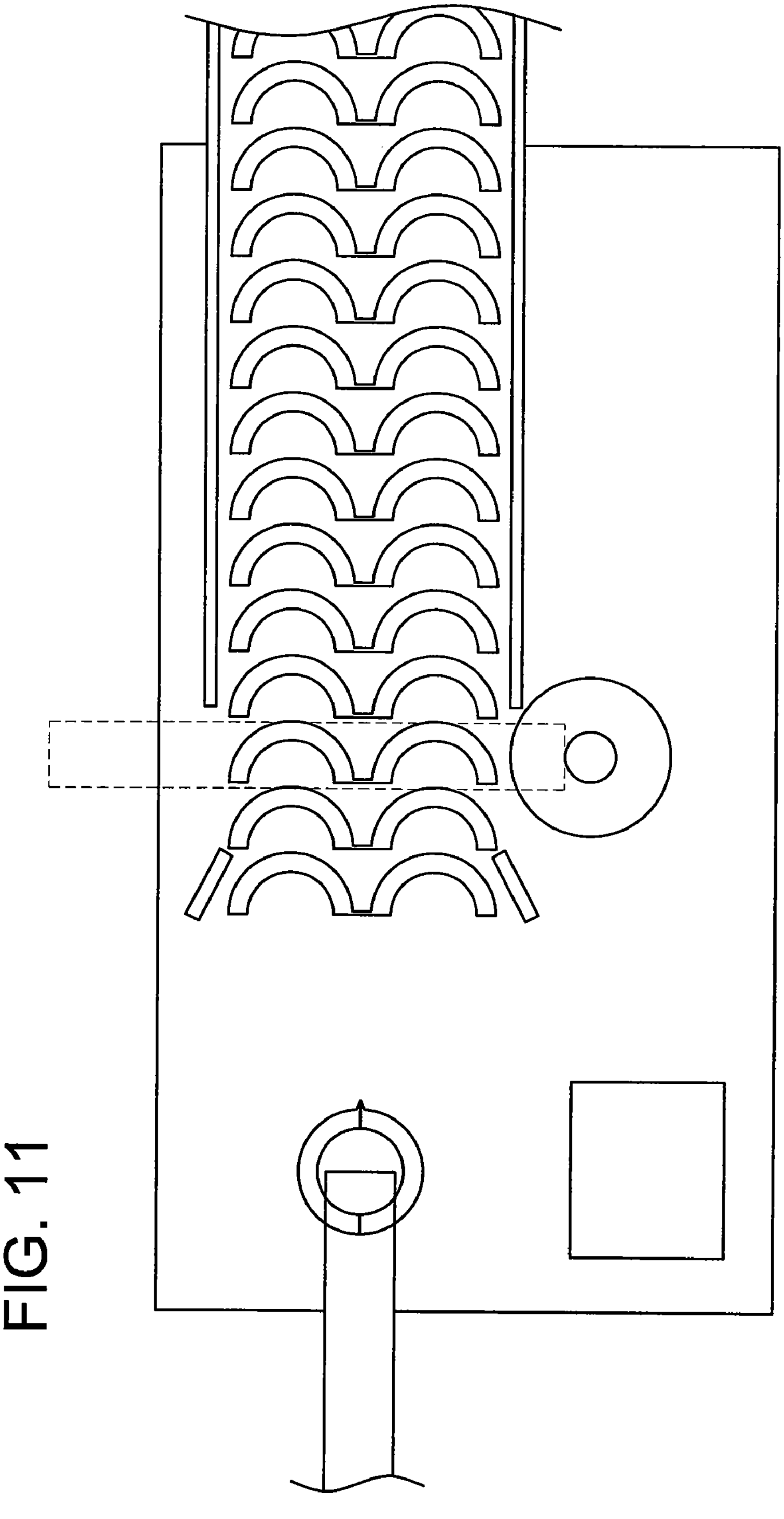
FIG. 11 is a side view of a plurality of binding elements being fed to an automated binding machine.

A plurality of such coupling elements may be utilized to chain three or more binding elements together to create a sheet of coupled binding elements. As shown in FIG. 10, for example, a coupling clip 40 of FIG. 2 may be used to couple together two adjacently disposed binding elements 110, 112. A further coupling clip 114 may be utilized to couple a third binding element to one of the first pair binding elements (112, for example, as illustrated). A third binding clip may then be utilized to couple a fourth binding element to the chain of binding elements, etc., to create a chain of binding elements of any desired length for storage, packaging, shipment or delivery to an automated binding process, as shown in FIG. 11. In the case of such an automated binding process, a separating force may be applied, as indicated above, for example, to separate the coupled binding elements either before, during, or after the binding process. Thus, the invention further includes an automated arrangement that includes such a coupled plurality of binding elements, and a process for delivering and separating a coupled plurality of binding elements.

Figure 12:
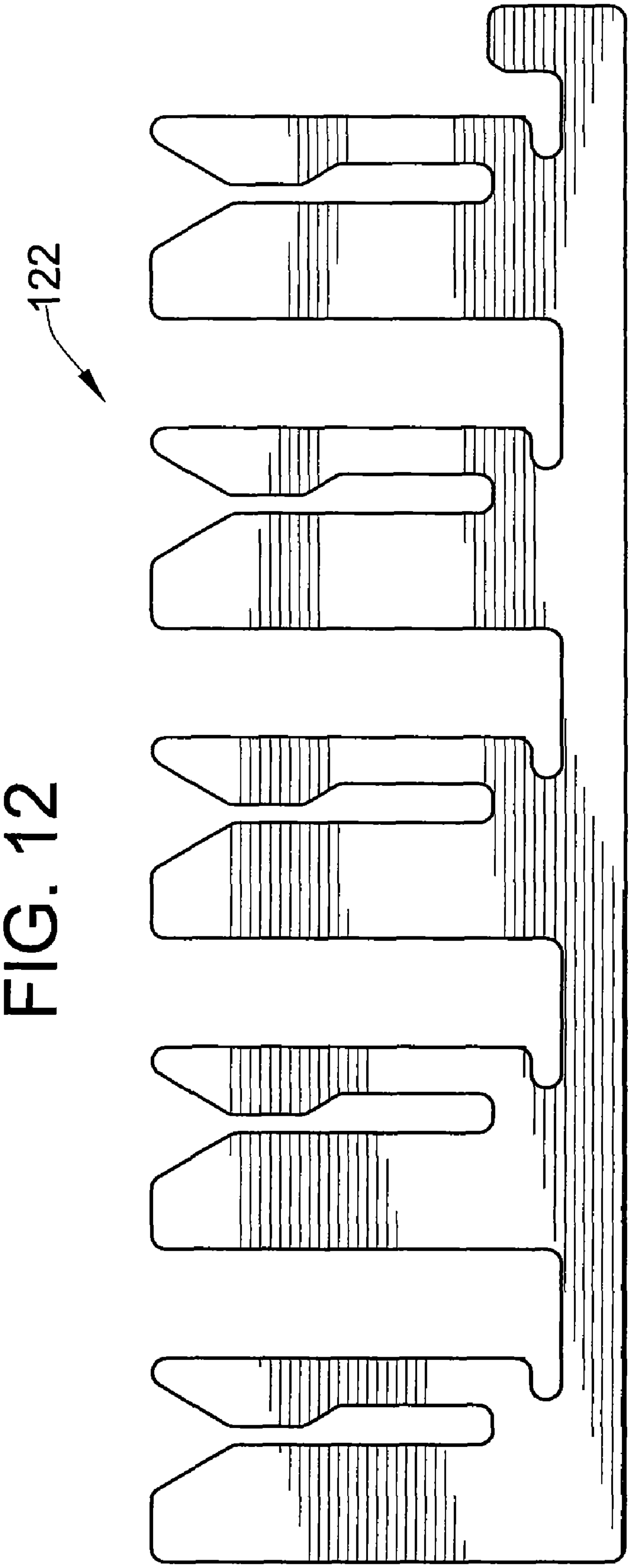
FIG. 12 is a front elevational view another alternate embodiment of the coupling clip constructed in accordance with teachings of the invention.

In another embodiment of the invention, a plurality of such coupling clips is formed as a single unit 122, as shown for example in FIG. 12. It will be appreciated that, as with the chained plurality of binding elements, the binding elements may be released from the coupling clip array 122 by application of appropriate sequentially applied forces.

Figure 13:
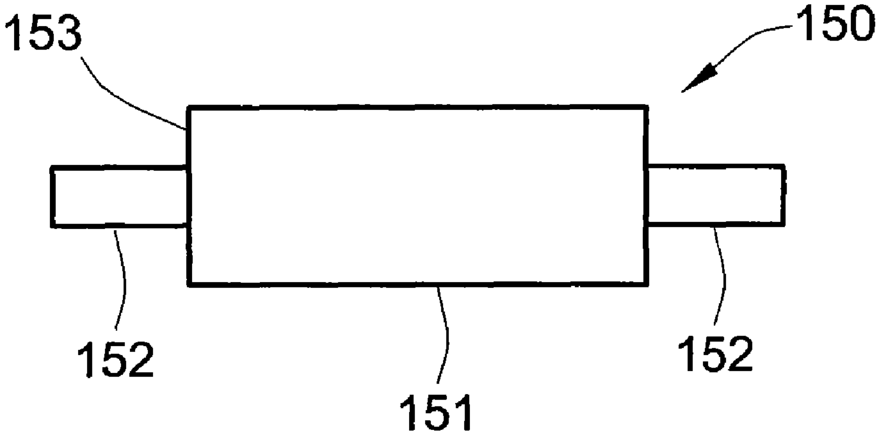
FIG. 13 is a side elevational view of another alternate embodiment of the coupling clip constructed in accordance with teachings of the invention.

It will be appreciated by those of skill in the art that the coupling clip may alternately include a protrusion that is received in a recess in a binding element. As shown in FIG. 13, in a simple embodiment of such a coupling clip 150, the coupling clip 150 comprises a pair of protrusions 152 that may be received in bores in respective binding elements to be coupled (not shown). The body 151 and the protrusions 152 therefrom may be of any desired cross-sections. It will be noted that the transition 153 from the protrusions 152 to the body 151 provide a ledge or sorts to facilitate maintaining the respective positions of the adjacent binding elements.

Figure 14:
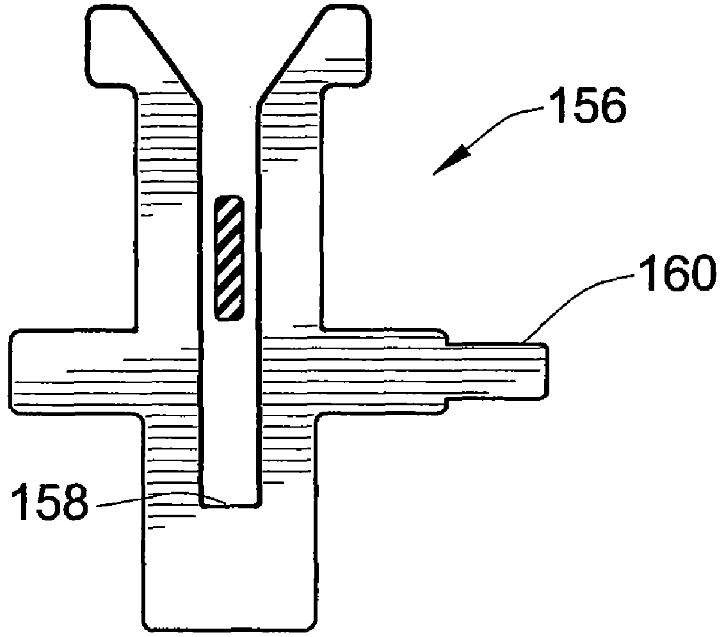
FIG. 14 is a side elevational view of another alternate embodiment of the coupling clip constructed in accordance with teachings of the invention.

Alternately, the coupling clip 156 may include a combination of recess(es) 158 and protrusion(s) 160, such as shown in FIG. 14. In this way, the recess 158 may receive a portion of a binding element (not shown), while the protrusion 160 may be received in a bore or other recess in a binding element to be adjacently coupled (not shown). It will thus be appreciated that a wide variety of structural combinations is envisioned under the invention.

The coupling clips may be formed of any appropriate material by known fabrication methods, such as, for example, stamping or injection molding. They may be formed of any appropriate material, such as, for example, wood, metal, or plastic. After use, they may either be scrapped, or reused.

While this invention has been described with an emphasis upon preferred embodiments, variations of the preferred embodiments can be used, and it is intended that the invention can be practiced otherwise than as specifically described herein. Accordingly, this invention includes all modifications encompassed within the spirit and scope of the invention as defined by the following claims. For example, various aspects of the invention may be practiced simultaneously, such as a plurality of binding elements with stacking structures, flexible connectors and runners disposed in a cartridge.

All of the references cited herein, including patents, patent applications, and publications, are hereby incorporated in their entireties by reference.

I claim as my invention:

1. A sheet of coupled binding elements, the sheet comprising:

a plurality of binding elements including at least a first binding element, a second binding element, and a third binding element, each of the plurality of binding elements including a spine and a plurality of fingers extending from the spine, the plurality of fingers on each binding element configured to form a plurality of closed loops on each binding element for retaining a stack of perforated sheets; and a plurality of coupling clips being discrete structure from and removably coupled to the plurality of binding elements for coupling the plurality of binding elements in spaced apart relation, the plurality of coupling clips including at least a first coupling clip engaged with the first and second binding elements to couple the first and second binding elements together, and a second coupling clip engaged with the second and third binding elements to couple the second and third binding elements together, the first and third binding elements being coupled together by virtue of the first and second coupling clips both engaging the second binding element;

wherein each of the first and second coupling clips includes a first pair of legs defining therebetween a first recess, and a second pair of legs defining therebetween a second recess, the first binding element disposed in the first recess of the first coupling clip, the second binding element disposed in the second recess of the first coupling clip and in the first recess of the second coupling clip, and the third binding element disposed in the second recess of the second coupling clip.

2. The sheet of coupled binding elements of claim 1, further comprising:

a third coupling clip engaged with the third binding element and with a fourth binding element of the plurality of binding elements to couple the third and fourth binding elements together, the second and fourth binding elements being coupled together by virtue of the second and third coupling clips both engaging the third binding element.

3. The sheet of coupled binding elements of claim 1, wherein the first coupling clip engages the spines of the first and second binding elements, and wherein the second coupling clip engages the spines of the second and third binding elements.

4. The sheet of coupled binding elements of claim 3, wherein the first coupling clip and the second coupling clip both engage the spine of the second binding element adjacent one of the plurality of fingers.

5. The sheet of coupled binding elements of claim 1, the first and second coupling clips further comprising a force-receiving section intermediate the first and second pairs of legs such that the binding elements are separable from the respective coupling clips by applying a force to the force-receiving sections of the coupling clips, thereby causing the first pair of legs to move apart to open the first recess and the second pair of legs to move apart to open the second recess.

6. The sheet of coupled binding elements of claim 5, the first and second coupling clips further comprising an area of weakness at the respective force-receiving section that concentrates a force applied thereto to cause localized bending at the force-receiving section.

7. The sheet of coupled binding elements of claim 1, wherein each leg of the first pair of legs and the second pair of legs includes a ramped surface operable to guide binding elements into the adjacent first recess or second recess.

8. The sheet of coupled binding elements of claim 1, wherein a portion of the spine of the first binding element is disposed in the first recess of the first coupling clip, a portion of the spine of the second binding element is disposed in the second recess of the first coupling clip and in the first recess of the second coupling clip, and a portion of the spine of the third binding element is disposed in the second recess of the second coupling clip.

9. The sheet of coupled binding elements of claim 1, wherein the sheet is configured to be provided to an automatic binding machine operable to separate the binding elements from the coupling clips.

10. A sheet of coupled binding elements, the sheet comprising:

a plurality of binding elements including at least a first binding element, a second binding element, a third binding element, and a fourth binding element, each of the plurality of binding elements including a spine and a plurality of fingers extending from the spine, the plurality of fingers on each binding element configured to form a plurality of closed loops on each binding element for retaining a stack of perforated sheets; and a plurality of coupling clips being discrete structure from and removably coupled to the plurality of binding elements for coupling the plurality of binding elements in spaced apart relation, the plurality of coupling clips including at least a first coupling clip engaged with the spines of the first and second binding elements to couple the first and second binding elements together, a second coupling clip engaged with the spines of the second and third binding elements to couple the second and third binding elements together, and a third coupling clip engaged with the spines of the third and fourth binding elements to couple the third and fourth binding elements together, the first and third binding elements being coupled together by virtue of the first and second coupling clips both engaging the spine of the second binding element, and the second and fourth binding elements being coupled together by virtue of the second and third coupling clips both engaging the spine of the third binding element; and;

wherein each of the first, second, and third coupling clips includes a first pair of legs defining therebetween a first recess, and a second pair of legs defining therebetween a second recess, a portion of the spine of the first binding element disposed in the first recess of the first coupling clip, a portion of the spine of the second binding element disposed in the second recess of the first coupling clip and in the first recess of the second coupling clip, a portion of the spine of the third binding element disposed in the second recess of the second coupling clip and in the first recess of the third coupling clip, and a portion of the spine of the fourth binding element disposed in the second recess of the third coupling clip; and wherein the sheet is configured to be provided to an automatic binding machine operable to separate the binding elements from the coupling clips.

11. The sheet of coupled binding elements of claim 10, the first, second, and third coupling clips further comprising a force-receiving section intermediate the first and second pairs of legs such that the binding elements are separable from the respective coupling clips by applying a force to the force-receiving sections of the coupling clips, thereby causing the first pair of legs to move apart to open the first recess and the second pair of legs to move apart to open the second recess.

12. The sheet of coupled binding elements of claim 11, the first, second, and third coupling clips further comprising an area of weakness at the respective force-receiving section that concentrates a force applied thereto to cause localized bending at the force-receiving section.

13. The sheet of coupled binding elements of claim 10, wherein each leg of the first pair of legs and the second pair of legs includes a ramped surface operable to guide binding elements into the adjacent first recess or second recess.

14. A sheet of coupled binding elements, the sheet comprising:

a plurality of binding elements including at least a first binding element, a second binding element, and a third binding element, each of the plurality of binding elements including a spine and a plurality of fingers extending from the spine, the plurality of fingers on each binding element configured to form a plurality of closed loops on each binding element for retaining a stack of perforated sheets; and a plurality of coupling clips being discrete structure from and removably coupled to the plurality of binding elements for coupling the plurality of binding elements in spaced apart relation, the plurality of coupling clips including at least a first coupling clip engaged with the first and second binding elements to couple the first and second binding elements together, and a second coupling clip engaged with the second and third binding elements to couple the second and third binding elements together, the first and third binding elements being coupled together by virtue of the first and second coupling clips both engaging the second binding element;

wherein each of the first and second coupling clips includes a base portion, a first pair of legs defining therebetween a first recess, and a second pair of legs defining therebetween a second recess, the first and second pairs of legs extending from the base portion in generally the same direction; and wherein a portion of the spine of the first binding element is disposed in the first recess of the first coupling clip, a portion of the spine of the second binding element is disposed in the second recess of the first coupling clip and in the first recess of the second coupling clip, and a portion of the spine of the third binding element is disposed in the second recess of the second coupling clip.

15. The sheet of coupled binding elements of claim 14, wherein all of the legs of the first and second pairs of legs are parallel to one another as they extend from the base portion.

16. The sheet of coupled binding elements of claim 14, wherein each leg of the first pair of legs and the second pair of legs includes a ramped surface operable to guide binding elements into the adjacent first recess or second recess.

17. The sheet of coupled binding elements of claim 14, the first and second coupling clips further comprising a force-receiving section intermediate the first and second pairs of legs such that the binding elements are separable from the respective coupling clips by applying a force to the force-receiving sections of the coupling clips, thereby causing the first pair of legs to move apart to open the first recess and the second pair of legs to move apart to open the second recess.

18. The sheet of coupled binding elements of claim 17, the first and second coupling clips further comprising an area of weakness at the respective force-receiving section that concentrates a force applied thereto to cause localized bending at the force-receiving section.

* * * * *